Nov. 8, 1960      E. KOE      2,958,943
SLICING KNIFE
Filed May 20, 1957
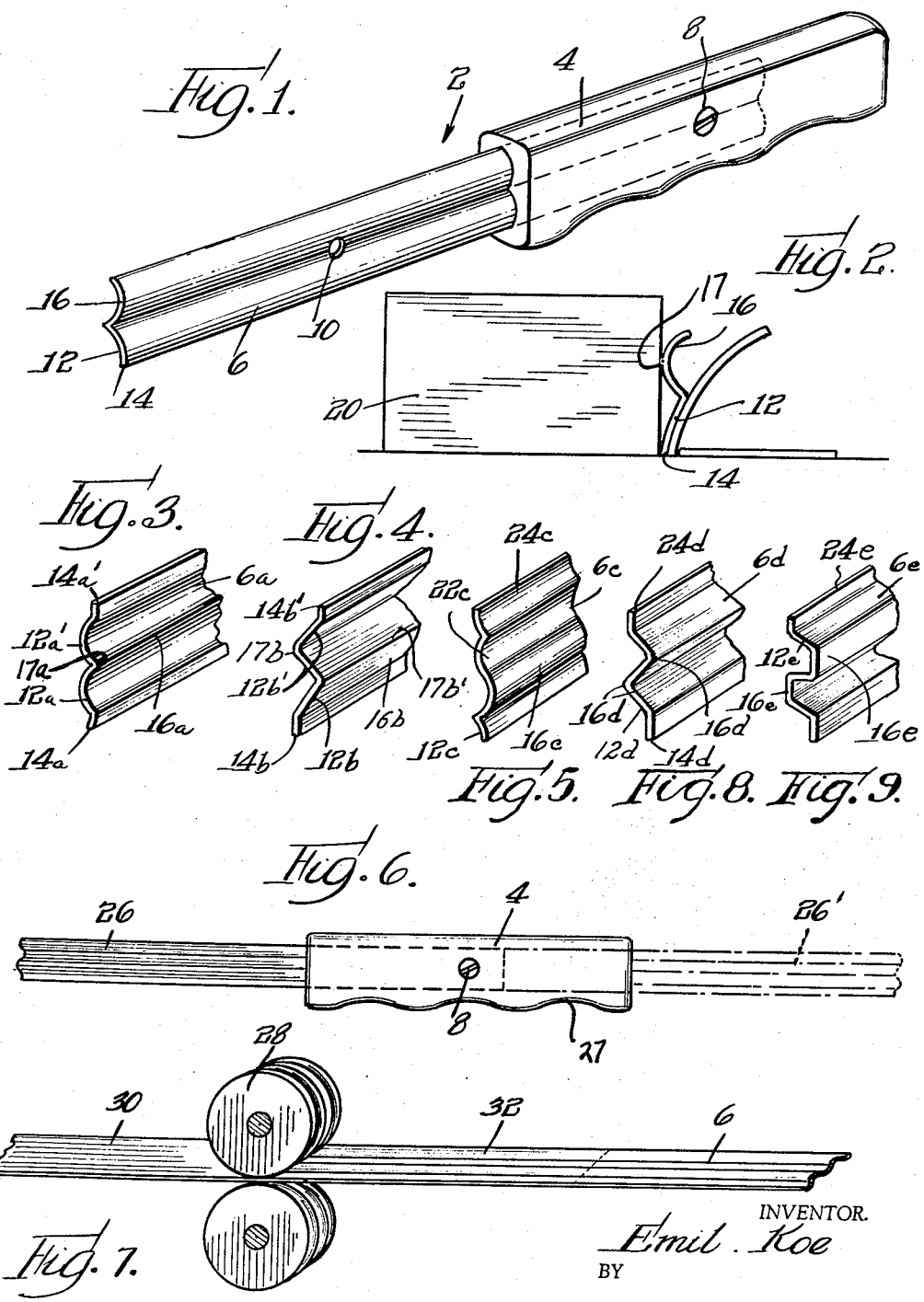
INVENTOR.
Emil Koe

United States Patent Office 2,958,943
Patented Nov. 8, 1960

2,958,943

SLICING KNIFE

Emil Koe, Berwyn, Ill., by distribution under Illinois law, two-thirds to Emil Koe, Jr., and one-third to Anna Koe, heirs of said Emil Koe, deceased Filed May 20, 1957, Ser. No. 660,177

1 Claim. (Cl. 30—115)

This invention relates to a knife of novel design and more specifically, contemplates a knife adapted for the efficient slicing of substances such as cheese which normally have a tendency to adhere to knife blades of ordinary construction.

It is a primary object of this invention to produce knives which while presenting a cutting edge, at the same time, present a minimum area of contact of the knife blade body relative to the loaf or other form of material being sliced, thereby minimizing the binding effect which is encountered by the use of conventional knives.

Another object of this invention is to provide a knife blade having the aforementioned characteristic and presenting at the same time, a peeling surface to separate slices of the cheese or other substance from the loaf or mass from which it is being cut.

It is still another object of the invention to present a knife which is capable of being used by left handed and right handed users and in the case of knives of the type contemplated by this invention, special designs of blade can accomplish this purpose, or in the alternative the blade can be reversed relative to the handle to accomplish the same result.

It is further an object of this invention to provide a knife which while exposing only a limited amount of area of the blade body to the substance being cut has features which assure the guiding of the knife blade as it penetrates the loaf or mass of material into which it is moved in order to assure uniform slices of the substance.

And, it is still another object of the invention to provide an extremely economical knife blade, the blade preferably being made of material of uniform cross section, at the same time, having blade characteristics which assure rigidity and strength so necessary in the manufacture of knife blades.

This and other objects of the invention will be more clearly understood by a study of the following specifications and claims taken together with a study of the drawings wherein:

Fig. 1 shows one embodiment of the invention in perspective view.

Fig. 2 shows an end view of a loaf of cheese or similar substance with the knife blade shown in Fig. 1 positioned in cutting arrangement relative to the loaf.

Fig. 3 shows a portion of a knife blade which has reversible characteristics.

Fig. 4 shows still another form of knife blade having reversible characteristics.

Fig. 5 shows a further embodiment of knife blade which can be used by right and left handed users.

Fig. 6 shows a knife blade associated with a handle and demonstrates one means in which an irreversible blade could be made into a left handed knife from a right handed knife.

Fig. 7 shows one method by which I contemplate making blade elements. Figs. 8 and 9 show two additional embodiments similar in operation to the embodiment contemplated in Fig. 5.

The above figures represent only a few of the embodiments contemplated by this invention. These few embodiments being hereinafter described and in situations where definite forms of the invention are referred to, like numerals will be used to denote the similarity of elements.

The embodiment shown in Fig. 1 shows a knife 2 consisting of a handle 4 and a blade element 6. The handle is preferably made of a material which can be easily worked such as plastic or wood to make the necessary forms on the interior of the handle to accept the knife blade. The blade 6 shown in Fig. 1 is an elongated member having a substantially uniform cross-section throughout its length. It is made of a thin material which is rigidified by means, such as ribs, extending throughout its lenfth. Said blade 6 consists of a cutting edge 14 which is supported by an arched or arcuate surface 12 which diverges laterally from said cutting edge 14 in this embodiment in a shallow curve of limited extent relative to the width of the blade and provides a peeling surface to separate material being cut from a loaf or mass of material. This is clearly seen in Fig. 2 wherein the cutting edge has severed the slice of cheese and the peeling surface 12 has separated the slice from the loaf 20 and has caused it to move outwardly relative to the loaf. Extending upwardly from the aforementioned peeling surface is another surface which in the embodiment shown in Fig. 1, consists of an arched section. This section is integral with surface 12 along a sharply defined longitudinal line and extends abruptly in a lateral direction opposite to the direction of divergence of surface 12 forming a first rigidifying rib at the juncture of the two sections. Section 16 is preferably more sharply curved than surface 12 so that it provides a guide surface 17 clearly shown in Fig. 2 which exposes only a small area of this portion of the body 16 to the cheese loaf or other object being worked upon. In essence this means that as the knife blade is pushed through the loaf the cutting edge and guide surface when positioned in a common plane afford a minimum exposure of knife blade to the cheese loaf and cooperate together to assure straight slicing of the loaf while the aforementioned peeling surface 12 separates the slices as it is sheared or cut therefrom. Also shown in the blade is an aperture 10 which is shown merely for purposes of illustration as means for accepting the screw 8 in the handle of the knife. The blade as it is presently mounted on the handle of Fig. 1 is mounted for use by a right handed person cutting on the right hand side of the loaf whereas by loosening the screw and forcing the knife blade through the slot which traverses the entire length of the knife handle, and thereafter re-positioning the screw in hold 10, the blade is now properly set for a left handed person slicing on the left hand side of a loaf. In the form of the invention shown in Fig. 1, such re-mounting of the knife blade is necessary where right and left handed users are involved.

Fig. 3 shows a form of the knife blade which demonstrates the invention, the blade being made of such a form as to be usable by a right or left handed user without the necessity of switching the blade from one end of a handle element to the other. The embodiment shown in Fig. 3 is shown with the cutting edge 14a at the bottom adapted to be used by a right handed person to cut material from the right hand side of a loaf. The device shown in Fig. 4 with the cutting edge 14b at the bottom is shown in a position to be used by a left handed person to cut material from the left side of a loaf or the like. Commenting on these two forms it will be noted that immediately adjacent the cutting edges 14a and 14b respectively, are the peeling surfaces 12a and 12b and interconnected with the guide surface 17a and 17b respectively. The guide surface for the cutting edge 14a' is 17a in Fig. 3, but in the case of the cutting edge 14b' the guide surface is 17b'.

In Figs. 5, 8 and 9 various forms of the invention are shown which take on slightly different contours from the standpoint of cross sectional characteristics, but each of which are provided with substantially the same basic elements heretofore described. In Fig. 5 the surfaces of the form, 12c and 22c are curved which relates it quite directly to the form shown in Fig. 1, with the exception that the blade provided is a double edged cutting blade which can be used without the necessity of determining which edge of the blade is exposed. In essence the embodiment disclosed in Fig. 5 is a composite of two blades of the type shown in Fig. 1 having the free edges of the respective sections 16 joined in a smooth curve. Both cutting edges when presented to the work, as disclosed, are designed for a right handed user cutting on the right hand side of the loaf. In such a form where a left handed user desires using same on the left hand side of the loaf to cut, it would be necessary to make the same change of the handle, end for end of the blade that was described relative to the form shown in Fig. 1. The same longitudinal movement of the blade relative to the handle would necessarily apply to the form shown in Fig. 8, as this embodiment is only adaptable to use for either a right or left handed user when the handle is mounted on a particular end of the blade. This position relationship of handle to blade for use by either a right or left handed user is also true of the third form shown in Fig. 9.

In all of the forms thus far described, it is apparent that when consistent with manufacturing methods I intend to make these blades from stock of uniform thickness which, of course, adds much to their economy of manufacture. By using relatively thin stock in some instances I will be able to avoid the extra step of sharpening the cutting edge, but at the same time since each of the forms of the blade presented have angular or curved surfaces which extend throughout the length of the cutting surface of the blade, these surfaces in effect rigidify the blade by providing ribs and despite the relatively thin material used, presents a blade having great strength and being relatively inflexible from the standpoint of its utility for the intended purpose. It has been demonstrated by me in the various embodiments which have been reduced to practice, that where the material is roll formed from continuous strips and cut off in suitable lengths (as is seen in Fig. 7) or where individual strips of material are pressed between dies to provide the desired formations in cross sections previously described, that I can effectively present the guide surfaces, peeling surfaces and cutting edges which carry out the objects of my invention in a very desirable manner.

In comparing forms, it will be noted that in some forms such as shown in Fig. 3, I present guide surfaces which being arcuate in cross section expose only a line of contact to the loaf being cut, while in others such as the form shown in Fig. 9 I have presented guide surfaces 16e presenting more than a line of contact, namely, limited areas of exposure which give a more substantial guide surface. I have done this purposely for it is somewhat desirable when cutting relatively soft materials such as cheese, to have a surface of a predetermined amount exposed which would be more than merely line contact. This means that greater pressure would have to be applied in a direction transverse of the knife blade in order to cause the knife to stray from the path desired by the user of the blade.

In Fig. 6 I have shown the operation previously described relative to the embodiment shown in Fig. 1, namely, the reversibility of a blade in the handle structure with which it is associated. Shown in dash lines within the handle is the knife blade 26 mounted by the use of a screw or the like 8 to hold the blade in place. 26' is knife blade 26 removed from the mounted position hereinbefore described and re-mounted by the use of the same set screw 8, but with a knife blade extending beyond the other end of the handle. The finger accepting recesses 27 assures the user that the proper edge of the blade has been exposed when a blade is used which is of irreversible type as shown in Fig. 1.

I have described above the several forms of the invention which I contemplate and which in summary, consist of a knife blade formed to provide a cutting edge, a peeling surface immediately adjacent the cutting edge, a guide surface in the vicinity of the upper portion of the peeling surface, all of said surfaces being a portion of the blade body per se and being so, interconnected in cross section as to present deformed surfaces which rigidify the blade by the ribbing feature which they present. While there are many other forms of the invention which might be disclosed, the above embodiments adequately describe the contribution that I have made, and what I claim is:

A knife for slicing a loaf of food product or the like including a handle and a blade mounted in and extending from said handle, the portion of the blade extending from said handle being of substantially uniform cross section throughout its length, said blade consisting of a strip of material having a cutting portion along each of the longitudinal margins for substantially the entire length of said blade, the body portion of said blade adjacent each of said cutting portions in cross section presenting a pair of formed surfaces extending outwardly from a common plane passing through each of the cutting edges of said cutting portion in opposite directions to provide a pair of deflecting surfaces for slices of material when one of the cutting edges progresses through the food product, the body portion of the blade interconnecting said deflecting surfaces extending in an opposite direction to each of said formed deflecting surfaces and traversing the aforementioned common plane, the intersection of said deflecting surfaces and said body portion interconnecting said deflecting surfaces providing at their juncture guide surfaces for respective cutting portions which project laterally beyond said common plane in opposite directions and spaced on opposite sides of the longitudinal center line of the blade which are of limited area along the entire length of the extended blade portion and being of limited area, each of said cutting portions and their respective guide surfaces lying in planes so as to assure direction of the cutting portion in a direction parallel to the plane in which said cutting portion lies.

References Cited in the file of this patent

UNITED STATES PATENTS

| | | |
|---|---|---|
| 196,354 | Harris | Oct. 23, 1877 |
| 751,848 | Goldsmith | Feb. 9, 1904 |
| 864,812 | Thuilher | Sept. 3, 1907 |
| 2,178,267 | Potstada | Oct. 31, 1939 |
| 2,389,882 | Wood | Nov. 27, 1945 |
| 2,641,832 | Champlin | June 16, 1953 |